United States Patent [19]

Yamaguchi et al.

[11] 4,366,702
[45] Jan. 4, 1983

[54] KNOCK DETECTING APPARATUS FOR INTERNAL COMBUSTION ENGINES

[75] Inventors: Hiroaki Yamaguchi, Anjo; Tadashi Hattori; Yoshinori Ootsuka, both of Okasaki, all of Japan

[73] Assignee: Nippon Soken, Inc., Nishio, Japan

[21] Appl. No.: 178,282

[22] Filed: Aug. 15, 1980

[30] Foreign Application Priority Data

Aug. 23, 1979 [JP] Japan .................. 54-107500
Oct. 23, 1979 [JP] Japan .................. 54-137165
Oct. 24, 1979 [JP] Japan .................. 54-138033

[51] Int. Cl.³ ............................................. G01L 23/22
[52] U.S. Cl. ........................................... 73/35; 73/651
[58] Field of Search ............... 73/35, 651, 654, 517 R; 310/15, 25

[56] References Cited

U.S. PATENT DOCUMENTS

| 2,275,675 | 3/1942 | Draper et al. .......................... 73/35 |
| 2,319,219 | 5/1943 | Draper et al. .......................... 73/35 |
| 2,424,864 | 7/1947 | Treseder ................................ 73/651 |
| 2,643,869 | 6/1953 | Clark .................................. 73/654 X |
| 3,281,743 | 10/1966 | Anderson ........................ 73/517 R X |
| 3,943,390 | 3/1976 | Ochiai ................................... 310/15 |
| 4,275,586 | 6/1981 | Gast et al. ............................... 73/35 |

Primary Examiner—James J. Gill
Attorney, Agent, or Firm—Cushman, Darby & Cushman

[57] ABSTRACT

A magnetic path is formed by a vibrating member disposed in a housing in the radial direction and fixed at its end to the housing, a central magnetic path portion which is disposed to make a gap between the vibrating member and the central magnetic portion and to extend in the axial direction of the housing substantially at its center, a radial magnetic path portion extending from the central magnetic path portion in the radial direction of the housing with a predetermined spacing kept from the vibrating member, and an outer peripheral magnetic path portion extending from the outer peripheral side of the radial magnetic path portion toward the vibrating member. A permanent magnet for supplying magnetic flux to the magnetic path is disposed at the central magnetic path portion in the form of bar or at the outer peripheral magnetic path portion in the form of ring or to surround the central magnetic path portion. The outer peripheral magnetic path portion may be magnetically shielded by housing made of a magnetic material. The vibrating member and the central magnetic path portion may be assembled beforehand to be an integral structure.

5 Claims, 30 Drawing Figures

KNOCK DETECTING APPARATUS FOR INTERNAL COMBUSTION ENGINES

BACKGROUND OF THE INVENTION

The present invention relates to knock detecting apparatus, and particularly to a knock detecting apparatus suitable for use with an ignition timing control apparatus for an internal combustion engine, which detects knocking from the vibrations emitted to the outside of the engine cylinder due to the pressure therein and the ignition timing of the engine is adjusted so as to obtain a desired knock intensity.

It is well known in the art that there is a close correlation between the ignition timing and the cylinder pressure. When the mixture is exploded in the absence of any knock harmonic components (usually those frequency components in the range between 5 and 10 kHz, and in the frequency band determined by the bore diameter of the engine cylinder and the velocity of sound in the combustion and which is produced as the result of intermittent and rapid combustion) will not be superpositioned on the cylinder pressure. On the contrary, when the engine starts knocking, such high frequency components start to be superposed on the cylinder pressure at around its peak value and this has the effect of causing emission of vibrations or sound to the outside of the cylinder. A close examination of the pressure in the cylinders or the vibrations or sound emitted to the outside of the cylinders will show that the beginning of knock (trace knock) occurs at the engine crank angle at which the cylinder pressure attains the maximum value. As knocking graduallyincreases (light knock and heavy knock), the resulting harmonic components on the cylinder pressure gradually appear at an earlier crank angle than that corresponding to the maximum cylinder pressure value (or on the ignition side). Thus, the engine efficiency will be increased greatly if the vibrations or sound emitted by knocking to the outside of the cylinders is detected with a high degree of accuracy and fed back to control the ignition timing. However, presently no detecting apparatus has been proposed which is capable of detecting the presence of knock or feedback factor with improved accuracy and which is also operable stably under severe environmental conditions required for vehicles.

Prior art knock detecting apparatus of the above type include those which employ piezoelectric type accelerometers for detecting knocking vibrations generated in the engine. This accelerometer is required to meet the characteristic requirements of the knocking detector for internal combustion engine, but is disadvantageous in the following points:

(1) Since the timing at which knocking can be detected in the internal combustion engine becomes earlier as the level of knocking becomes greater, the knocking level at which ignition timing is adjusted should be less than the trace knock level and the detection must be performed with high precision and stability. The piezoelectric element has essentially a high impedance and is liable to be affected by moisture and dust so that the very small signal associated with trace knocking is difficult to produce stably (due to increased drift and fluctuations). The piezoelectric characteristic of the element occurs because of polarization and the operating conditions of the combustion engine greatly change cyclically from high temperature to low temperature, so that this polarization is gradually decreased thereby reducing the sensitivity of the piezoelectric element. The decrease of the sensitivity of the piezoelectric element results in the increase of the knocking control level so that the apparatus is responsive only to a strong knocking, and thus the engine is sometimes damaged by the knock.

(2) The detector should be inexpensive too. However the piezoelectric element has a high impedance and its output must be amplified by an expensive amplifier having a high input impedance called a charge amplifier. In addition, this high-impedance amplifier is liable to be affected and misoperated by noise due to ignition signal of the internal combustion engine, and hence it is further necessary to use an expensive, complicated arrangement for the prevention of the influence.

(3) The piezoelectric element has a weak impact resistance, is liable to be cracked or broken off, and requires a cooling means for use at a high temperature, and thus it is unsuitable for a detector on a vehicle from the viewpoint of durability and cost.

SUMMARY OF THE INVENTION

Accordingly it is an object of the present invention to provide a knock detecting apparatus with high sensitivity, light weight, low cost and a high mechanical strength.

DESCRIPTION OF THE PREFERRED EMBODIMENTS

The present invention will hereinafter be described as to the embodiments as illustrated.

Figure 1:
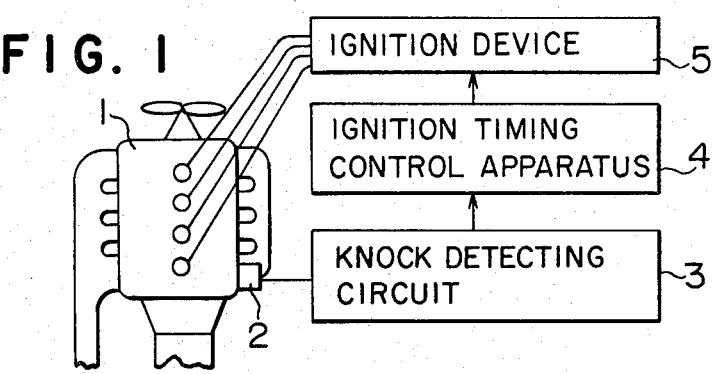
FIG. 1 shows a schematic block diagram of a knock feedback type ignition system with which a knock detecting apparatus according to the present invention is used.

Referring to FIG. 1, there is illustrated a schematic block diagram of a knock feedback type ignition system incorporating the knock detecting apparatus according to the invention. In the Figure, a knock detecting apparatus 2 mounted on the cylinder block of an in-line type four-cylinder internal combustion engine 1 by means of a screw or the like. A knock detecting circuit 3 detects knocking in the engine 1 from the output signal of the knock detecting apparatus 2. An ignition advance control device responsive to the output of the sensing circuit 3 to advance or retard the ignition timing to the optimum time. The output signal from the control device 4 is applied through a known type of ignition device 5 to the spark plugs mounted in the engine 1 so as to ignite the air-fuel mixture. The knock detecting circuit 3 used in this system detects the ignition signal (not shown). The presence of knock is detected by (1) sampling the noise components caused by the engine vibrations during a certain time interval or certain crank angle degrees in which no knocking occurs immediately after ignition, in accordance with the output of the detecting apparatus 2, and (2) taking the ratio between the same and the output of the knock detecting apparatus produced during a certain time interval or certain crank angle degrees after the top dead center (TDC) or after the peak cylinder pressure (the ratio may sometimes be an integrated, or averaged value). Alternatively, the presence of knock may be detected not by means of a single signal but by a probability process. For example, the presence of knock may be detected in accordance with the percentage of knocking events in 100 times of ignition. The ignition timing control device 4 advances or retards the ignition timing in accordance with the presence or absence of knocking. While the knock detecting circuit 3 and the ignition advance control device 4 are known in the art and their detailed constructions will not be described, it is apparent that the apparatus of this invention can be used with any types of such circuit and device provided that the presence of knock is detected and the ignition timing is controlled accordingly.

Figure 2A:
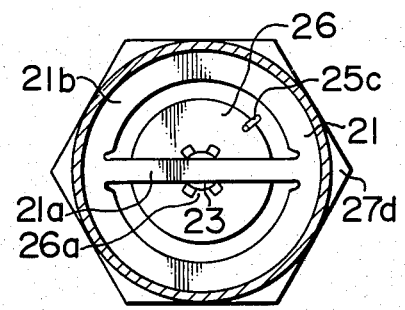
FIGS. 2A and 2B are respectively a cross-sectional view taken along line IIA—IIA in FIG. 2B and a longitudinal sectional view, of a first embodiment of the detector according to the invention.
Figure 2B:
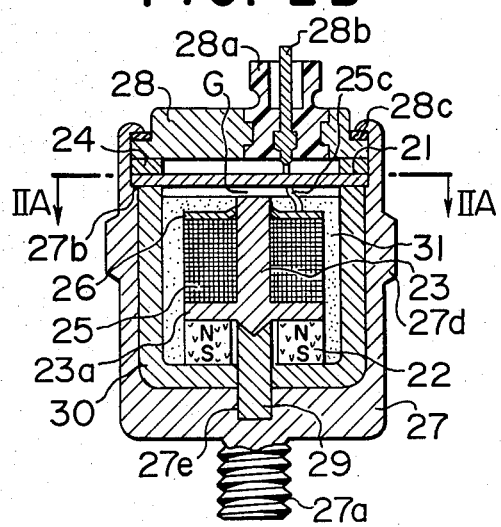

The knock detecting apparatus 2 of the present invention will now be described in detail. In FIGS. 2A and 2B showing a first embodiment of the invention, numeral 21 designates a disk-like vibrating means made of a magnetic material (e.g., iron or any of iron-nickel alloys) and having resonant frequencies at knocking frequencies ranging from 5 to 10 kHz. This vibrating means 21 comprises a reed member 21a having the resonant frequencies 5 to 10 kHz and a support member 21b for holding the reed assembly 21a, these members are made of a single magnetic plate. The reed member 21a is supported at its ends by the support member 21b. Numeral 22 designates a cylindrical-shaped magnet of alnico, ferrite or the like and which is magnetized in the axial direction with N-pole on the upper side and S-pole on the lower side as shown in FIG. 2B. Numeral 23 represents a cylinder-shaped bar magnetic member made of iron, iron-nickel alloy or the like and which extends in the axial direction to form the central magnetic path with its one end being opposite to the member 21a to form a gap G therebetween. At the other end of the magnetic member 23 there is provided a flange 23a which is made in contact with the magnet 22. Numeral 25 represents a coil directly wound around the bar-like magnetic member 23. One end of the coil 25 is electrically connected to this bar-like magnetic member 23 by peeling off the insulating film of the beginning end conductor and by directly winding it on the magnetic member 23. The other end 25c of the coil 25 is led out through a seal plate 28 which covers the opening end of a housing 27. Numeral 26 represents a holding plate made of a nonmagnetic material and which serves as a bobbin of the coil 25. At the center hole of the plate 26 there are provided a plurality of projections 26a. The ends of projections 26a define a hole having a diameter smaller than the diameter of the bar-like magnetic member 23. The holding plate 26 is secured to the member 23 by pressing holding plate 26 into member 23 so that projections 26a engage member 23. Numeral 29 denotes a support made of a nonmagnetic material such as aluminum, copper alloy or stainless steel, one end of which is securely connected to the magnetic member 23 by welding, soldering, driving in or the like, and the other end of which is driven in a recess 27e which is provided in the center of the bottom of the housing 27 through the center hole of a cup-shape magnetic member 30. This support 29 is made of a non-magnetic material and thus most suitably designed to have a magnetic reluctance great enough to be substantially equivalent to air gap. The peripheral wall of the housing 27 is approximately cylindrical and made of a magnetic material of iron, iron nickel alloy or the like (in this case, it may be of a nonmagnetic material). The housing 27 has a block mounting screw 27a at the lower portion, the vibrating member 21 secured to its upper inner peripheral surface, a step 27b for sealing the interior and a hexagonal portion for wrench for tightening the housing 27 to the engine block with the screw 27a. In these magnetic elements of the structure, those which are apt to rust, such as the vibrating member 21 are sometimes plated with a magnetic material such as nickel, cobalt or the like. The sealing plate 28 serves to seal the detector thereby protecting it from the moisture and dust of the external air. This plate 28 is made of a nonmagnetic material such as stainless steel or the like. Firmly fitted onto the plate 28 is a resin connecter 28a having signal take-out terminals 28b fixedly embedded therein. The output terminal 25c of the coil 25 is connected to the output terminal 28b of this resin connecter 28a, and this output terminal 28b is connected through an external socket (not shown) to external signal lines. The cup-shaped magnetic member 30 has its outer peripheral and outer bottom surfaces made in close contact with the inner peripheral and inner bottom surfaces of the housing 27. Between the support member 21b of the vibrating member 21 and the seal plate 28 there is interposed a support member 24 made of a magnetic material (which may be replaced by a nonmagnetic material) and which keeps the support member 21b of the vibrating member 21 in close contact with the end of the cup-shaped magnetic member 30 and the step 27b of the housing 27. This support member 24 is fitted onto the inner peripheral surface of the housing 27 by driving or the like so as to support the vibrating member 21 stably and securely. In the space between the outer peripheral edge of the plate 28 and the opening end of the housing 27 is placed a sealing 28c which is made of rubber, and the opening end of the housing is calked to seal tightly. In this detecting apparatus, a magnetic path is formed by the north pole of the magnet 22, the bar magnetic material 23, the gap G, the vibrating member 21, the cup-shaped magnetic material 30 and the south pole of the magnet 22. Thus, in this embodiment, the center magnetic path portion is formed by the magnetic material 23 and the magnet 22, the radial magnetic path portion is formed by the bottom wall of the cup-shaped magnetic material 30, and the outer peripheral magnetic path portion is formed by the side peripheral wall of the cup-shaped magnetic material 30. In order to prevent the interlinkage magnetic flux from change due to the relative positional shift of the coil 25, magnet 22 and the magnetic material 23, a mold resin 31 is filled closely in the housing 27 except the peripheral area of the vibrating member 21.

The operation of the construction will be described. The detector 2 as described above is secured to the cylinder block with the screw 27a. The knocking vibration caused in the cylinder block is transmitted to the vibrating member 21 through the housing 27 and the cup-shaped magnetic material 30. Since the reed segment 21a is fastened tightly at both ends to the housing 27, the reed segment 21a itself comes to vibrate at its natural frequency in accordance with the frequency and intensity of the vibration of knocking. At this time, since the elements other than the reed segment 21a is provided to move with the housing 27, the reed segment 21a alone vibrates in the magnetic path, so that the gap G is changed to vary the magnetic reluctance of the magnetic path, thereby inducing a voltage in the coil in response to the change of magnetic flux. This voltage signal is applied through a single signal line connecting the end 25c and the terminal 28b to the detecting circuit because the beginning end of the coil 25 is grounded through the bar-like magnetic material 23 and the support 29 to the housing. Since all the magnetic flux emerging from the magnet 22 does not pass the above magnetic path (some magnetic flux leaks to the external), the leaking magnetic flux is considerably reduced as compared with that passing through the closed magnetic circuit, by selecting proper quality of the components and suitable spacings therebetween. Thus, the flux leakage does not particularly present any problem. Since the reed segment 21a is designed to resonate to the knocking frequency (for example, 8 kHz substantially at the center between 7 and 10 kHz), the knocking detection sensitivity particularly is high at this frequency, and the signal sensitivity in the other frequency bands is relatively reduced. Thus, the S/N ratio in the knocking detection is increased.

Figure 3A:
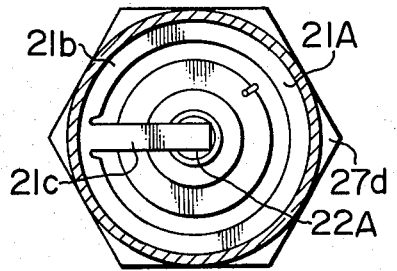
FIGS. 3A and 3B are respectively a cross-sectional view taken along line IIIA—IIIA in FIG. 3B, and a longitudinal sectional view, of a second embodiment of the detector according to the invention.
Figure 3B:
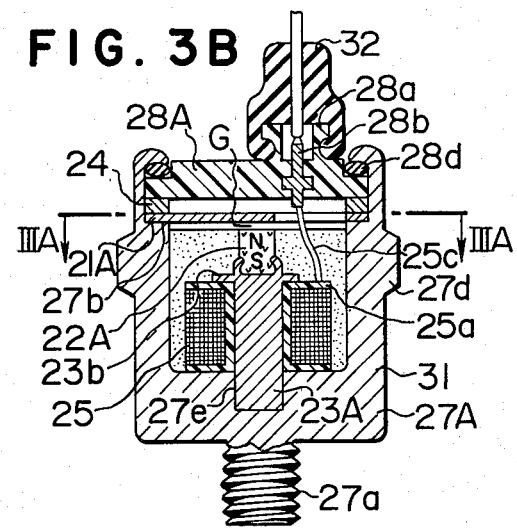

FIGS. 3A and 3B show a second embodiment of the detector according to the invention. This second embodiment differs from the first embodiment mainly in the following points. First, the vibrating member 21A has the reed segment 21c extending toward the center from the support member 21b, and all the seal plate 28A is formed of a resin. A resin connector 28a with a terminal 28b fixedly embodded therein is formed to be integral with the connector 28a. An O-ring seals a housing 27A to the seal plate 28A. A cylindrical magnet 22A magnetized in the axial direction is secured to the tip end of a bar-like magnetic material 23A by calking. The other end of the material 23A is securely driven in a drive recess 27e provided at the center of the bottom of the housing 27A. The coil 25 is wound on a resin bobbin 25a with the bar-like magnetic material 23A inserted therethrough. The bobbin 25a and the coil 25 thereon are pressed against the housing 27A by a flange 23b provided at the tip end of the bar-like magnetic material 23A. The beginning end of the coil 25 is connected securely to the inner peripheral surface of the housing 27 by soldering, calking or spot welding. The housing 27A is formed of a magnetic material, and also serves as the cup-shaped magnetic material 30 in FIG. 2. The magnetic path is formed by the N-pole of the magnet 22A, the gap G, the vibrating member 21A, the housing 27A, the bar-like magnetic material 23A, and the S-pole of the magnet 22A. Thus, in this second embodiment, the magnet 22A and the bar-like material 23A forms the center magnetic path portion, the bottom wall of the housing 27A forms the magnetic path portion in the radial direction, and the side peripheral wall of the housing 27 forms the outer peripheral magnetic path portion. Also in this embodiment, knocking is detected with good S/N ratio in accordance with the resonant frequency of the reed segment 21c. Numeral 32 represents a socket which engages with the resin connector 28a.

Figure 4:
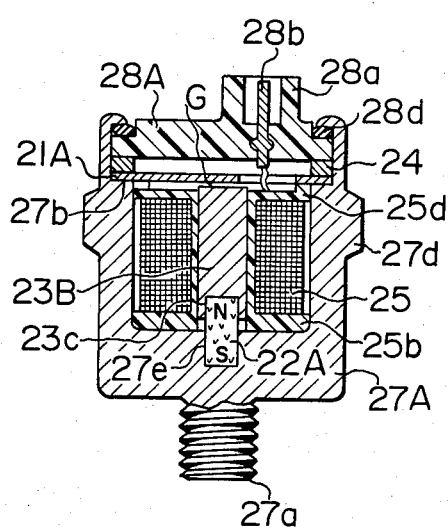
FIGS. 4 and 5 are respectively longitudinal cross-sections of third and fourth embodiments of the detector according to the invention.

FIG. 4 shows a third embodiment of the detector according to the invention. This third embodiment is different from the second embodiment mainly in the following points. The lower end of the magnet 22A is tightly driven into the drive recess 27e provided at the center of the bottom of the housing 27A. The upper end of a magnet 22A is driven tightly into a drive recess 23c provided at the lower end of a bar-like magnetic material 23B. The coil 25 is wound on a resin bobbin 25b which is integrally provided at its upper end with a project 25d. The bobbin 25b and the coil 25 thereon are pressed against the housing 27A through the projection 25d by the support member of 21b of the vibrating member 21A. To prevent the interlinkage magnetic flux from change due to the relative positional shift of the coil 25, magnet 22A and the bar-like magnetic material 23B, the bobbin 25b and the bar-like magnetic material 23B are connected by an adhesive or the like instead of using the mold resin 31 (of course the mold resin 31 may be used). The projection 25d provided at the bobbin 25b is designed in a C-shape so as to be pressed against the support member 21b not to the root of the reed segment 21c of the vibrating member 21. Therefore, this projection 25d never changes the vibration characteristics of the reed segment 21c.

Figure 5:
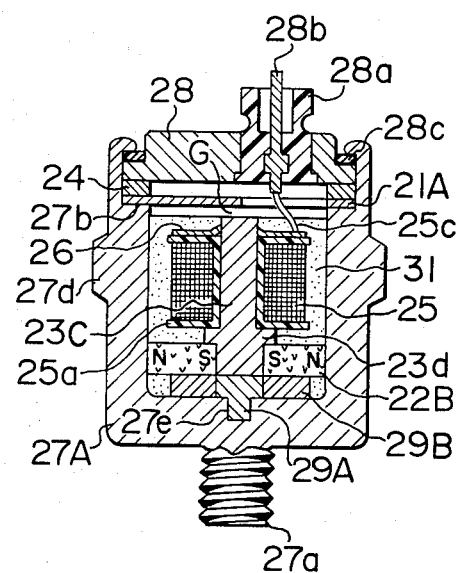

FIG. 5 shows a fourth embodiment of the detector of the invention. This fourth embodiment differs from the first embodiment mainly in the following points.

First, as in the second embodiment, the cup-like magnetic material 30 is replaced by the housing 27A of a magnetic material, and there is used the vibrating member 21A having the reed segment 21c of one side. The coil 25 is wound on the resin bobbin 25a. The bar-like magnetic material 23C with the bobbin 25a fixed by the pressing plate 26 is provided with a flange 23d at a lower position of the mid portion. The magnetic material 23C at the lower portion is engaged into the center hole of the disk magnet 22B by the flange 23d. The outer periphery of the magnet 22B is made in contact with the inner peripheral wall surface of the housing 27A and magnetized to have the S-pole at its center and the N-pole at the outer peripheral side. Shown at 29A is a support of a nonmagnetic material, one end of which is fixed to the bar-like magnetic material 23C by welding or the like, and the other end of which is driven tightly into the recess 27e provided at the bottom center of the housing 27A. For a proper space between the magnet 22B and the bottom surface of the housing 27A, a ring-shaped spacer 29B made of a non-magnetic material is engaged with the support 29A. The magnetic path is formed by the N-pole of the magnet 22B, the housing 27A, the vibrating member 21A, the gap G, the bar-like magnetic material 23C, and the S-pole of the magnet 22B. Thus, in the fourth embodiment, the bar-like magnetic material 23C forms the central magnetic path portion, the magnet 22B forms the magnetic path portion in the radial direction, and the side peripheral wall of the housing 27A forms the outer peripheral magnetic path portion.

Figure 6A:
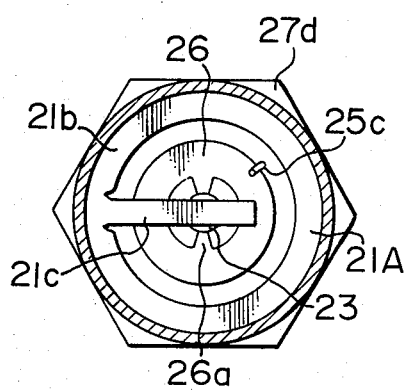
FIGS. 6A and 6B are respectively a cross-sectional view taken along line VIA—VIA in FIG. 6B, and a longitudinal sectional view, of a fifth embodiment of the detector according to the present invention.
Figure 6B:
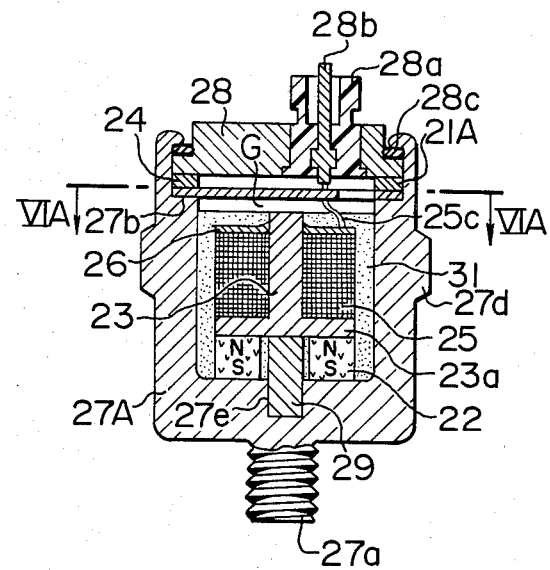

FIGS. 6A and 6B shows a fifth embodiment of the detector according to the invention. This fifth embodiment differs from the first embodiment mainly in the following points. As in the second embodiment, the cup-like magnetic material 30 is replaced by the housing 27A of a magnetic material and the vibrating member 21A is used having the reed segment 21c of one side.

Figure 7:
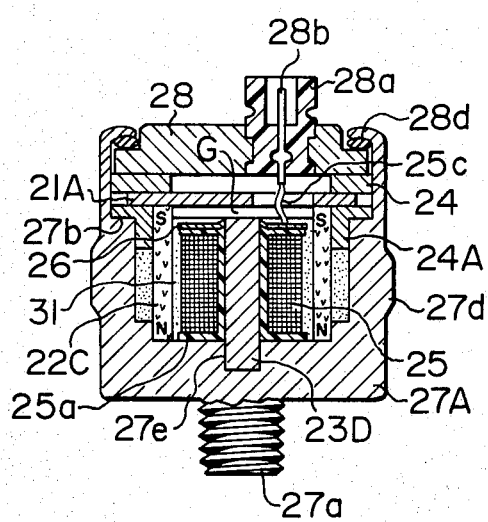
FIGS. 7, 8 and 9 are longitudinal sectional views of sixth, seventh and eighth embodiments of the detector according to the present invention, respectively.

FIG. 7 shows a sixth embodiment of the detector of the invention. This sixth embodiment differs from the fourth embodiment mainly in the following points. The lower end of a bar-like magnetic material 23D on which the coil 25 is wound is tightly driven into the drive recess 27e provided at the bottom center of the housing 27A. A cylindrical magnet 22C is provided on the outer periphery of the coil 25. The upper end of this magnet 22C is made in contact with the vibrating member 21A and the lower end of the magnet 22C with the bottom wall surface of the housing 27A. To provide a proper space between the side peripheral surface and the magnet 22C, a nonmagnetic ring spacer 24A of L-shaped cross-section is interposed between the vibrating member 21A, the step 27b of the housing 27A and the magnet 22C. Between this spacer 24A and the support member 24 is placed the support member 21b of the vibrating member 21A. In this case, it is desired to make the support member 24 of a nonmagnetic material. The magnetic path is formed by the N-pole of the magnet 22C, the housing 27A, the bar-like magnetic material 23D, the gap G, the vibrating member 21A and the S-pole of the magnet 22C. In this embodiment, the bar-like magnetic material 23D forms the central magnetic path portion, the bottom wall of the housing 27A forms the magnetic path portion in the radial direction, and the magnet 22C forms the outer peripheral magnetic path portion.

Figure 8:
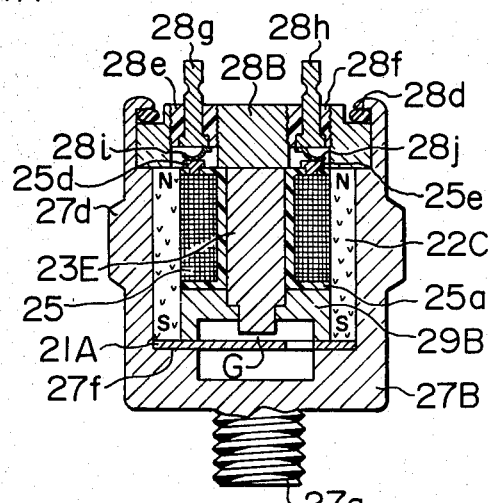

FIG. 8 shows a seventh embodiment of the invention. This seventh embodiment differs from the sixth embodiment mainly in the following points. First, the cylindrical magnet 22C is closely inserted in a housing 27B of nonmagnetic material. The vibrating member 21A has its support member 21b made in contact with a step 27f provided at the bottom wall side of the housing 27B. Between this step 27f and the magnet 22C is placed the support member 21b of the vibrating member 21A. 29B represents a nonmagnetic ring spacer disposed on the upper portion of the vibrating member 21A. On this spacer 29B there are supported the coil 25 and a bar-like magnetic material 23E. The lower end of this bar-like magnetic material 23E penetrates through the center hole of the spacer 29B to oppose the reed segment of the vibrating member 21A through the gap G. A coil bobbin 25a has the coil 25, and contacts 25d and 25e fixedly embedded therein. One end of the coil 25 is connected to the contact 25d and the other end thereof to the contact 25e. To the opening end of the housing 27B is fixed a seal plate 28B made of a magnetic material, to which two electrodes 28g and 28h are secured through resin insulator 28e and 28f, respectively. To the lower ends of the electrodes 28g and 28h are secured contact springs 28i and 28j, respectively. When the plate 28B is fixed to the housing 27B, the contact springs 28i and 28j are pressed against the contacts 25d and 25e on the bobbin 25a to be made in contact therewith, respectively, so that the output of the coil 25 is transmitted through the contacts 25d, 25e and contact springs 28i, 28j to the electrodes 28g, 28h and then to the external. In this embodiment, the magnetic path is formed by the N-pole of the magnet 22C, the plate 28B, the bar-like magnetic material 23E, the gap G, the vibrating material 21, and the S-pole of the magnet 22C. Thus, in this embodiment, the bar-like magnetic material 23E forms the central magnetic path portion the plate 28B forms the magnetic path portion in the radial direction, and the magnet 22C forms the outer peripheral magnetic path portion. According to this embodiment, since the output of the coil 25 is transmitted through the contacts, the conductor need not be soldered, and since the vibrating member 21A is disposed near the cylinder block, the operation is more stable.

Figure 9:
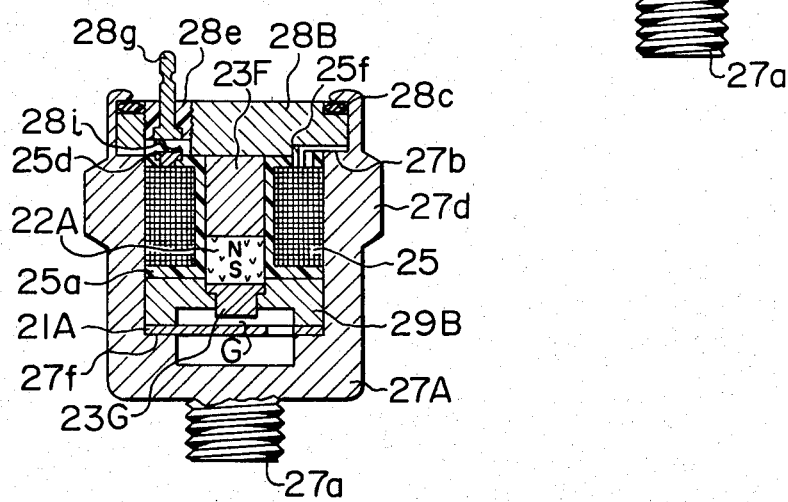

FIG. 9 shows an eighth embodiment of the invention. This embodiment differs from the seventh embodiment mainly in the following points. The support member 21b of the vibrating member 21A is placed between the spacer 29B and the step 27f provided at the bottom wall side of the housing 27A made of a magnetic material. In the center hole of the spacer 29B is fitted a cylindrical magnetic material 23G, the lower end of which is opposed to the reed segment of the vibrating member 21A through the gap G. On the magnetic material 23G are disposed the cylindrical magnet 22A and a cylindrical magnetic material 23F in stacked condition. Around the magnet 22A is disposed the bobbin 25a on which the coil 25 is wound. The one end 25f of the coil 25 is held between the plate 28B and the step 27b provided at the opening end side of the housing 27A. By peeling off the insulating film of the wire of the coil at the held portion, the one end 25f of the coil 25 is grounded to the housing 27A. According to this eighth embodiment, the magnetic path is formed by the N-pole of the magnet 22A, the magnetic material 23F, the plate 28B, the housing 27A, the vibrating member 21A, the magnetic material 23G and the S-pole of the magnet 22A. Thus, in this embodiment, the magnet 22A, and the magnetic materials 23F and 23G form the central magnetic path portion, the plate 28B forms the magnetic path portion in the radial direction, and the side peripheral wall of the housing 27A forms the outer peripheral magnetic path portion. As in the seventh and eighth embodiments in which the vibrating member 21A is provided at the bottom wall side of the housings 27B, 27A, since it is difficult to fill the mold resin 31 within the housing 27B, 27A, the elements other than the vibrating member 21 are fixed by an adhesive or the like.

Figure 10A:
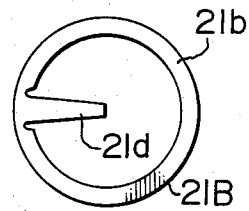
FIGS. 10A to 10I are front and perspective views of other examples of a vibrator used in the embodiments.
Figure 10B:
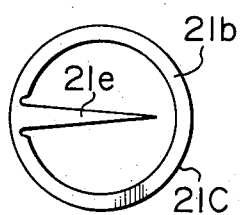
Figure 10C:
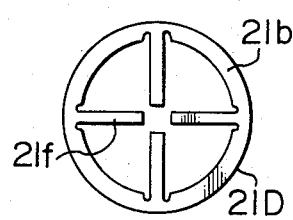
Figure 10D:
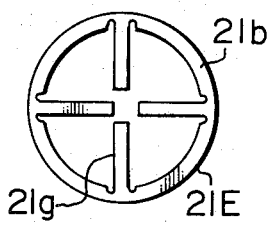
Figure 10E:
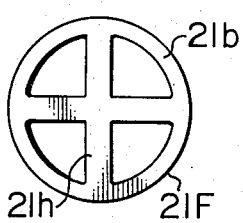
Figure 10F:
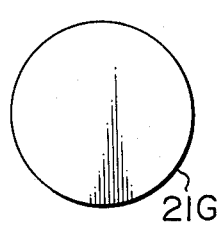
Figure 10I:
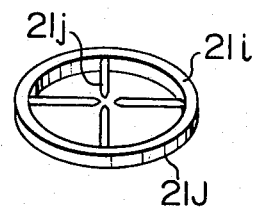
Figure 10G:
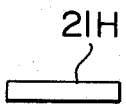
Figure 10H:
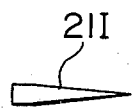

Other various constructions of the vibrating member different from those in the above embodiments can be considered as will be described with reference to FIGS. 10A to 10I. FIG. 10A shows a vibrating member 21B having a trapezoid reed segment 21d, FIG. 10B a vibrating member 21C having a triangular reed segment 21C, and FIG. 10C a vibrating member 21D having a plurality of reed segments 21f with the same resonant frequency. FIG. 10D shows a vibrating member 21E having a plurality of reed segments 21g of different lengths with different resonant frequencies in the range of the knocking frequency band, FIG. 10E a vibrating member 21F having a cross-shaped reed segment 21h each end of which is connected to the support member 21b, and FIG. 10F a disk-like vibrating member 21G having no reed segment. FIGS. 10G and 10H show vibrating members 21H and 21I, respectively which have no ring-like support 21b except the reed segment. The vibrating members 21H, 21I have their ends secured to the housings 27, 27A, 27B at proper locations. In this case, when a plurality of resonant frequencies are desired, a desired number of the vibrating member 21H, 21I may be provided on the inner peripheral surface of the housing 27, 27A, 27B. Each of the vibrating members as described above is formed by punching or cutting. In FIG. 10I, the bar-like magnetic reed segments 21j are driven in and secured to the wall of the ring-shaped magnetic support member 21i, thereby forming the vibrating member 21J. The resonant frequencies and the number of the frequency points can be freely determined by changing the length of the reed segment 21j and the number thereof. Thus, the vibrating member to be used may be of any one of various constructions having different resonant frequencies, shaped, and magnetic materials. Any resonant frequency can be selected by changing the shape.

Figure 11:
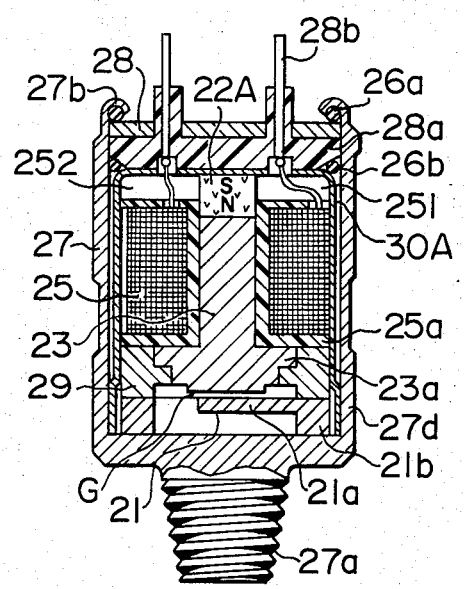
FIGS. 11 and 12 are respectively longitudinal sectional views of ninth and tenth embodiments of the detector according to the invention.

FIG. 11 shows a ninth embodiment of the invention. This embodiment differs from the above-mentioned embodiments mainly in the following points. A cut-shaped magnetic cylinder 30A of a magnetic material is provided which has a cylinder-shaped side peripheral surface of about 0.5 to 1 mm in thickness. The outer diameter of its opening end portion is slightly greater than the inner peripheral diameter of the housing 27 so that the magnetic cylinder 30A is forcibly inserted into the housing 27. The outer diameter of the side peripheral wall except the opening end portion is made slightly smaller than the inner diameter of the housing 27 so that a magnetic gap is formed between the side peripheral walls of the magnetic cylinder 30 and housing 27. Shown at 251 and 252 are slit-like grooves which are provided on the bobbin 25a. The respective ends of the coil 25 are led out through the grooves 251 and 252. In this detector, the magnetic path is formed by the N-pole of the magnet 22A, the bar-like magnetic material 23, the gap G, the vibrating member 21, magnetic cylinder 30A, and the S-pole of the magnet 22A. Thus, in this embodiment, the magnetic material 23 and the magnet 22 form the central magnetic path portion, the bottom wall of the magnetic cylinder 30A forms the magnetic path portion in the radial direction, and the side peripheral wall of the magnetic cylinder 30A forms the outer peripheral magnetic path portion.

Thus, since there is provided within the housing 27 and the seal plate 28 the cylinder 30A forming the magnetic path portion in the radial direction and the outer peripheral magnetic path portion through the magnetic gap therebetween, the housing 27 and the seal plate 28 serve as magnetic shield member, by which the external magnetic field produced in the starter and the alternator of the automobile is permitted to pass through the housing 27 and the seal plate 28 but almost prevented from passing through the magnetic cylinder 30A. Thus, the effect of the external magnetic field on the knocking detector can be removed, the magnet 22A can be prevented from deteriorating in its characteristics, and noise due to the external field does not occur.

Figure 12:
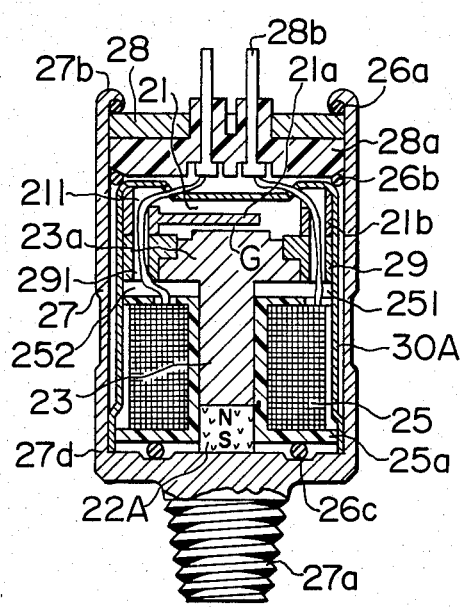

FIG. 12 shows a tenth embodiment of the detector according to the invention. This embodiment is the reverse of the arrangement of the vibrating member 21, the magnet 22A, the bar-like magnetic material 23, the coil 25 and the spacer 29 in the ninth embodiment as shown in FIG. 11. In FIG. 12, numeral 26c represents an O-ring interposed between the bobbin 25a and the inner bottom surface of the housing 27, and 211 and 291 apertures provided in the vibrating member 21 and the spacer 29 so as to lead each end of the coil 25 to the terminal 28b. In this embodiment, the bottom wall of the housing 27 forms the magnetic path portion in the radial direction, the side peripheral wall of the magnetic cylinder 30A forms the outer peripheral magnetic path portion, and the magnetic material 23 and magnet 22 forms the central magnetic path portion. Also in the ninth embodiment, the coil 25 produces the knocking detection output due to the vibration of the vibrating member 21, and the housing 27 and the plate 28 constitute a magnetic shield member.

Figure 13:
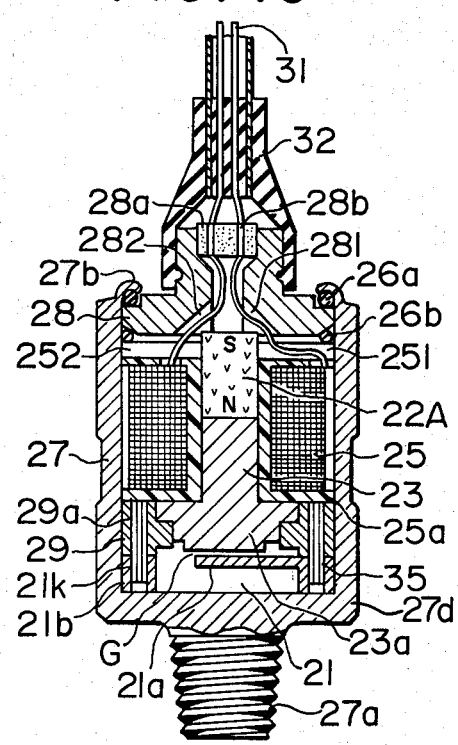
FIG. 13 is a longitudinal sectional view of eleventh embodiment of the detector according to the invention.
Figure 14A:
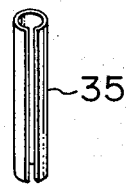
FIGS. 14A and 14B are perspective and front views of a knock pin in the detector as shown in FIG. 13.
Figure 14B:
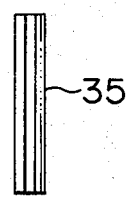

FIG. 13 shows an eleventh embodiment of the invention. This embodiment differs from the above embodiment mainly in the following points. Into the spacer 29 is forcibly driven and secured the flange 23a of the bar-like magnetic material. A plurality of (for example, four) pin apertures 29a, 21k are bored in the spacer 29 and the support member 21b of the vibrating member 21 at equal intervals in the axial direction. Into the apertures 29a, 21k are driven and fastened knock pins 35, and thereby before being placed in the housing 27, the support member 21b of the vibrating member 21 and the bar-like magnetic material 23 are combined into one beforehand through the spacer 29. One example of the knock pin 35 is shown in FIGS. 14A and 14B. This knock pin is a spring pin of a cylindrical shape which is made by rolling a piece of a plate. The outer diameter of this knock pin 35 is made larger than the inner diameter of the apertures 29a, 21k so that when this knock pin 35 is forcibly driven or inserted into the aperture 29a, 21k, the outer diameter of the knock pin 35 shrinks due to its elasticity and the elastic restoring force strongly combines the spacer 29 and the support member 21b of the vibrating member 21. In addition, since the spacer 29 is a nonmagnetic material, its magnetic reluctance is made equivalent to the air gap, or sufficiently high. Numerals 281 and 282 represent slit-like grooves provided in the plate 28 for the purpose of leading out each end of the coil 25. In this detector, the magnetic path is formed by the N-pole of the magnet 22A, the bar-like magnetic material 23, the gap G, the vibrating member 21, the housing 27, the seal plate 28 and the S-pole of the magnet 22A. Thus, in this embodiment, the magnetic material 23 and the magnet 22A form a central magnetic path portion, the seal plate 28 forms the magnetic path portion in the radial direction, and the side peripheral wall of the housing forms the outer peripheral magnetic path portion.

With this construction, since the bar-like magnetic material 23 and the vibrating member 21 are combined into one beforehand through the spacer 29 before being placed in the housing 27, the vibrating member 21 can be examined on its vibration characteristics by a vibrator before being placed in the housing 27 under the integrally connected state. On the basis of the examination results, the reed segment 21a is cut to adjust the vibration characteristics of the vibrating member 21. After the adjustment the integral body of the bar-like magnetic material 23 and the vibrating member 21 is placed in the housing 27. Therefore, the knocking detector can be easily examined and adjusted. Consequently, before assembly, by examining and adjusting, the material quality of the vibrating member 21 and the width of the gap G on which the output of the detector depends, the detector with little scattering of output can be easily achieved. In this case, the dependence of the detector output on the material quality is due to the fact that for example, when a rolled material is used for the vibrating member 21, the constituent of the material varies at different positions therein, and in the presence of the gap difference when the gap G is too wide or narrow, the output of the detector is decreased or increased, respectively.

Figure 15:
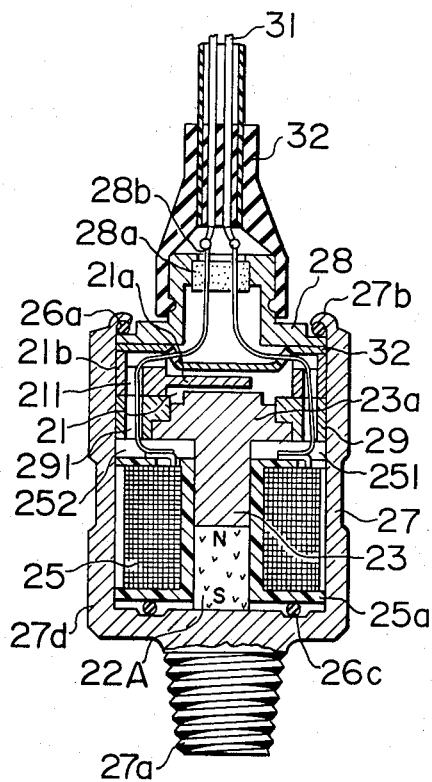
FIG. 15 is a longitudinal sectional view of a twelfth embodiment of the detector according to the invention.
Figure 16A:
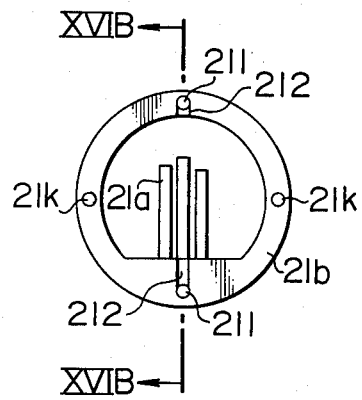
FIG. 16A is a front view of a vibrator in the detector as shown in FIG. 15.
Figure 17:
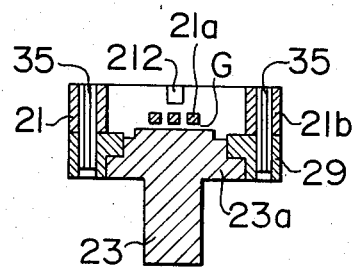
FIG. 17 is a longitudinal sectional view of a main part of the detector as shown in FIG. 15.
Figure 16B:
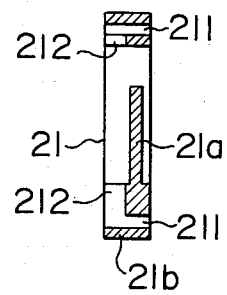
FIG. 16B is a longitudinal sectional view taken along line XVIB—XVIB in FIG. 16A.

FIG. 15 shows a twelfth embodiment of the detector of the invention. This embodiment is the reverse of the arrangement of the vibrating member 21, the magnet 22A, the bar-like magnetic material 23 and the spacer 29 in the eleventh embodiment as shown in FIG. 13. In FIG. 15, 26c represents an O-ring interposed between the bobbin 25a and the inner bottom surface of the housing 27. Numerals 211 and 291 denote lead wire apertures provided in the support member 21b of the vibrating member 21 and the spacer 29 through which each end of the coil 25 is connected to the terminal 28b. In this embodiment, the bottom wall of the housing 27 forms the magnetic path portion in the radial direction, the side peripheral wall of the housing 27 forms the outer peripheral magnetic path portion, and the magnetic material 23 and the magnet 22A forms the central magnetic path portion. Numeral 32 represents a plate-like spacer disposed on the vibrating member 21 with its peripheral edge being held between the support member 21b of the vibrating member 21 and the seal plate 28. The vibrating member 21 is constructed as shown in FIGS. 16A and 16B. A plurality of reed segments 21a are provided the lengths of which are different to provide different resonant frequencies in the knocking frequency range and extend to be longer than the linear length of the support member 21b. Two opposite pin apertures 21k are provided at positions separated 180° on the support member 21b. Two opposite lead wire apertures 211 are provided at positions which are separated 180° on the support member 21b and at right angles to the positions of the pin apertures 21k. On the support member 21b there are provided grooves 212 which are continuous to the lead wire apertures 211 so as to lead the ends of the coil 25 to the terminal 28b. FIG. 17 shows an integral structure of the bar-like magnetic material 23 and spacer 29 and a vibrating member 21, which structure is formed by the same method as in the detector illustrated in FIG. 13, and which may be formed beforehand by welding or other methods. Also in this twelfth embodiment, the knocking detection output can be obtained from the coil 25 by the vibration of the vibrating member 21 as in the eleventh embodiment, and the knocking detector can be easily examined and adjusted.

While in the embodiments as described previously, the coil 25 is used as a magnetic flux detecting means, a magnetic reluctance element or Hall element may be employed provided that it operates stably at temperatures 100° to 120° C.

While in the previously described embodiments the magnets 22, 22A, 22B and 22C are employed as the means for producing magnetic flux along the magnetic path, an exciting coil may be provided for the magnetic path. In this case, if the coil 25 is connected to an oscillator, and the magnetic reluctance of the magnetic path is changed by the vibration of the vibrating member 21 to change the load on the oscillator, the means for producing magnetic flux along the magnetic path is not particularly necessary.

While in the above embodiments the block mounting screw 27a and hexagonal surfaces 27d for enabling a wrench to grip housing 27 are provided in the housing 27, and the terminal 28b is provided in the seal plate 28, the terminal 28b may be provided in the housing 27 and, the block mounting screw 27a and the hexagonal surfaces 27d may be provided in the seal plate 28.

If in the above embodiments an inert gas is enclosed within the housing 27, 27A, 27B, the effect of moisture around the detector can be removed almost completely.

In the above embodiments, the output voltage in the coil 25 can easily be adjusted by changing the number of turns of the coil 25 and the width of the gap G.

While in the above embodiments magnets are used as means for establishing magnetic force along the magnetic path, coils and magnetic material may be combined to make a electromagnet although the number of output terminals is increased.

We claim:

1. A knock detecting apparatus for internal combustion engines comprising:
    a housing having a substantially cylindrical side peripheral wall;
    a vibrating member disposed in said housing in the radial direction and having a ring-shaped support member and a reed segment extending from an inner peripheral edge of said support member toward the center,
    said reed segment being integral with said ring-shaped support member and the peripheral portion of said ring-shaped support member being secured to the inner peripheral surface of said housing, said vibrating member having a resonant characteristic set at a knocking frequency;
    a bar-shaped central magnetic path member having one end spaced from said vibrating member to form an air gap and extending in the axial direction substantially in the center within said housing;
    a radial magnetic path member extending from the other end of said central magnetic path member in the radial direction of said housing;
    an outer cylindrical magnetic path member extending between the outer peripheral side of said radial magnetic path member and said vibrating member;
    a magnetic circuit being formed by said bar-shaped central magnetic path member, air gap, vibrating member, outer cylindrical magnetic path member and radial magnetic path member;
    a permanent magnet member located and included in said magnetic circuit; and
    a magnetic flux detecting means placed in said housing and magnetically coupled with said bar-shaped central magnetic path members for detecting change of the magnetic reluctance of said magnetic circuit due to a change in the width of said air gap caused by vibrations of said vibrating member.

2. A knock detecting apparatus according to claim 1, wherein said vibrating member is made from a sheet of magnetic material.

3. A knock detecting apparatus according to claim 1, further comprising a ring-shaped spacer made of a non-magnetic material and which is interposed between the support member of said vibrating member and said central magnetic path member so as to frictionally lock said central magnetic path member to said support member.

4. A knock detecting apparatus according to claim 3, wherein the integral coupling of the central magnetic path member and the support member of said vibrating member is achieved by forcibly inserting said central magnetic path member in said spacer to be fastened therein and fixedly driving a knock pin in said spacer and said support member of said vibrating member.

5. A knock detecting apparatus for internal combustion engines comprising:
- a housing having a substantially cylindrical side peripheral wall and being made of magnetic material;
- a vibrating member of magnetic material disposed in said housing in the radial direction and having its peripheral portion supported by said housing, said vibrating member having a resonant characteristic set at a knocking frequency;
- a bar-shaped central magnetic path member having one having one end spaced from said vibrating member to form an air gap and extending in the axial direction substantially in the center within said housing;
- a radial magnetic path member extending from the other end of said central magnetic path member in the radial direction of said housing;
- an outer cylindrical magnetic path member extending between the outer peripheral side of said radial magnetic path member and said vibrating member, said outer cylindrical magnetic path member being formed by a magnetic seal plate fixed to the opening end of said housing, whereby a magnetic gap is formed between said outer cylindrical magnetic path member and the side peripheral wall of said housing so as to provide a double magnetic structure; and
- a magnetic circuit being formed by said bar-shaped central magnetic path member, air gap, vibrating member, outer cylindrical magnetic path member and radial magnetic path member;
- a permanent magnet member located and included in said magnetic circuit; and
- a magnetic flux detecting means placed in said housing and magnetically coupled with said bar-shaped central magnetic path members for detecting change of the magnetic reluctance of said magnetic circuit due to a change in the width of said air gap caused by vibrations of said vibrating member.

* * * * *